United States Patent [19]

Nodelman

[11] Patent Number: 4,797,464
[45] Date of Patent: Jan. 10, 1989

[54] DIEPOXIDE REACTED WITH A HALF ESTER FROM A DICARBOXYIC ACID ANHYDRIDE AND POLYALKYLENE GLYCOL

[75] Inventor: Neil H. Nodelman, Pittsburgh, Pa.
[73] Assignee: Mobay Corporation, Pittsburgh, Pa.
[21] Appl. No.: 83,537
[22] Filed: Aug. 7, 1987
[51] Int. Cl.$^4$ .................... C08G 63/42; C08G 59/42
[52] U.S. Cl. .................... 528/110; 528/297; 560/91; 560/127; 560/198
[58] Field of Search .................... 560/91, 127, 198
[56] References Cited

U.S. PATENT DOCUMENTS 4,403,093  9/1983  Hartman et al. .................... 528/297

Primary Examiner—John Kight
Assistant Examiner—Frederick Krass
Attorney, Agent, or Firm—Gene Harsh; Joseph C. Gil; Richard E. L. Henderson

[57] ABSTRACT

A polyester polyol having the idealized structure:

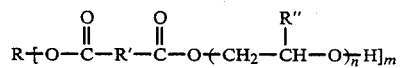

where R represents the residue of a polyepoxide after ring opening with a carboxylic acid group, R' represents the residue of a cyclic anhydride, n is a number of from 4 to 25, m represents the number of epoxy groups of the polyepoxide ring opened with carboxylic acid groups, and R" represents —H or —CH$_3$.

5 Claims, No Drawings

DIEPOXIDE REACTED WITH A HALF ESTER FROM A DICARBOXYIC ACID ANHYDRIDE AND POLYALKYLENE GLYCOL

BACKGROUND OF THE INVENTION

Polyester polyols produced from dicarboxylic acid anhydrides, polyols and polyepoxides are known. In U.S. Pat. No. 4,403,093, such polyester polyols are produced by first reacting a 1,2-dicarboxylic acid anhydride with a polyol under conditions sufficient to form a half-ester with substantially no polyesterification product. The resultant half-ester is then reacted with a polyepoxide under conditions sufficient to form an ungelled polyester oligomer. The resultant polyester oligomers are described as being useful as resinous binders in high solid containing compositions. As described in that reference, the polyols used to form the half-ester are those which contain from 2 to 20 carbon atoms. Preferred are aliphatic polyols selected from the group of neopentyl glycol; 2,2,4-trimethylpentane-1,3-diol: 2,2-dimethyl-3-hydroxypropyl-2,2-dimethyl-3-hydroxy- propionate; diethylene glycol; dipropylene glycol, 1,6-hexane diol: and trimethylol propane.

DESCRIPTION OF THE INVENTION

The present invention is directed to a novel polyester which when used in a reaction injection molding process yields a product having unexpectedly improved flame properties. More particularly, the present invention is directed to a polyester polyol having the idealized structure:

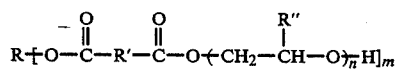

where R represents the residue of a polyepoxide after ring opening with a carboxylic acid group, R' represents the residue of a cyclic anhydride, n is a number of from 4 to 25, m represents the number of epoxy groups of the polyepoxide ring opened with carboxylic acid groups (and preferably represents 2 or 3, and most preferably 2), and R" represents H or —CH$_3$.

The polyesters of the present invention are made in a manner similar to that described in U.S. Pat. No. 4,403,093. In the first step, a cyclic dicarboxylic acid anhydride is reacted with a polyoxyethylene or polyoxypropylene glycol having a molecular weight of from about 200 to about 1500 under conditions sufficient to form a half-ester with substantially no polyesterification product. The resultant half-ester is then reacted with a polyepoxide under conditions to form the resultant polyester.

In preparing the polyesters of the present invention, a cyclic 1,2-dicarboxylic acid anhydride is reacted with polyoxyethylene or polyoxypropylene glycol under conditions sufficient to ring open the anhydride, t forming the half-ester with substantially no polyesterification occurring (i.e., both carboxyl groups of the anhydride esterified by polyol in a recurring manner).

In bringing an anhydride and a polyol together under suitable reaction conditions, reaction can occur in at least two ways. The desired reaction mode involves opening the anhydride ring with hydroxyl, i.e.,

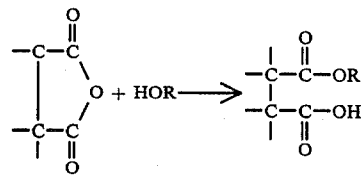

Alternately, carboxyl groups formed by opening of the anhydride ring can react with hydroxyl groups to give off water. The latter reaction is not desired since it can lead to polycondensation reactions resulting in products with broad molecular weight distributions.

To achieve reaction, the anhydride and polyol are contacted together, usually by mixing the two ingredients together in a reaction vessel. Preferably, the reaction is conducted in the presence of an inert atmosphere such as nitrogen.

For the desired ring-opening and half-ester formation reaction, a cyclic 1,2-dicarboxylic acid anhydride is used. Reaction of a polyol with a carboxylic acid instead of an anhydride would require esterification by condensation to eliminate water which would have to be removed by distillation which, under these conditions, would promote undesired polyesterification.

The reaction temperature is preferably low, that is, no greater than 160° C. and usually within the range of 60° C. to 160° C., preferably from 100° C. to 140° C. Temperatures greater than 160° C. are undesirable because they promote polyesterification, whereas temperatures less than 60° C. are undesirable because of sluggish reaction.

The time of the reation can vary depending upon the temperature of reaction. Usually, the reaction time will be from as low as 10 minutes to as high as 24 hours.

The molar ratio of anhydride to polyol is usually from about 0.5 to 1.5:1, and is preferably about 1:1 to obtain a maximum conversion with maximum purity. Ratios less than 0.5:1 are undesirable because they result in unreacted polyol. Ratios greater than 1.5:1 are not preferred because of increased formation of high molecular weight polyesters.

Among the cyclic anhydrides which can be used in the practice of the invention are those which, exclusive of carbon atoms in the anhydride moiety, contain from about 2 to 30 carbon atoms. Substituted cyclic anhydrides can also be used provided the substituents do not adversely affect the reactivity of the anhydride or the properties of the resultant polyester. Examples of substituents would be chloro and alkoxy. Examples of anhydrides include maleic anhydride, succinic anhydride, glutaric-anhydride, phthalic anhydride, tetrahydrophthalic anhydride, methyltetrahydrophthalic anhydride, hexahydrophthalic anhydride, methylhexahydrophthalic anhydride, tetrachlorophthalic anhydride, endomethylene tetrahydrophthalic anhydride, and chlorendic anhydride.

The polyols used to prepare the half-ester are polyoxyethylene or polypropylene glycols having molecular weight of from about 200 to about 1500, and preferably from about 200 to about 1000.

After the anhydride and polyol are reacted together, the resultant half-ester is further reacted with a polyepoxide to chain extend the half-ester to form a liquid polyester oligomer. Chain extension occurs through reaction of the carboxylic acid groups of the half-ester with the epoxy groups of the polyepoxide. Although the structure of the final product is not known with certainty, the major product (i.e. greater than 50 percent by weight based on total weight) is believed to be of the structure:

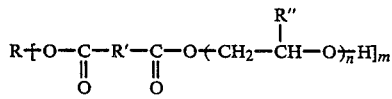

where R, R', R'', n and m are as defined earlier.

The half-ester and the polyepoxide are reacted together by contacting under conditions sufficient to form the polyester. Preferably, the half-ester and the polyepoxide are reacted in the presence of an inert atmosphere such as nitrogen.

The half-ester and polyepoxide can be contacted together by simply mixing the two together. It is preferred to add the polyepoxide to the half-ester incrementally so as to better control the reaction and to obtain higher yields of the desired liquid polyester oligomer. The proportions of the half-ester and the polyepoxide are such that the equivalent ratio of epoxy to carboxylic acid is from about 1:1 to 2.5:1. To obtain maximum conversion to the desired polyester, the equivalent ratio of epoxy to carboxylic acid is such that the acid number is reduced to an acceptable low value (e.g., less than 2.0). The preferred equivalent ratio is from 1:1 to 1.10:1, and is most preferably about 1.05:1. Ratios less than 1:1 result in less than the optimum amount of prouuct, whereas ratios greater than 1.1:1 may result in unreacted epoxy, which is undesirable.

The temperature of reaction should be less than 220° C. and usually within the range of about 60° C. to 220° C., and preferably 140° C. or less. Temperatures higher than 140° C. are undesirable because of competition between the hydroxyl groups and epoxy groups for reaction with carboxyl groups and between hydroxyl groups and carboxyl groups for reaction with expoxy groups, resulting in undesirable polyesterification reactions. Reaction temperatures less than 60° C. are undesirable because of sluggish reaction.

Further a catalyst (such as organophosphine) is preferably used. Examples of suitable catalyst of this include triarylphosphines such as triphenylphosphine. Examples of other catalysts include amines such as triethylamine and inorganic bases such as potassium hydroxide. When catalyst is used, it is used in amounts of about 0.1 to 2 percent by weight, based on total weight of the reactants. The presently preferred catalyst is one sold as Cordova Accelerator AMC-2, available from Cordova Chemical Company and believed to be a chromium octoate.

The time of reaction depends on how the reactants are contacted, the temperature of reaction and the presence or absence of catalyst. In general, reaction times will vary from about 30 minutes to 24 hours.

The polyepoxides which are used are those having 1,2-epoxy equivalency greater than 1, preferably 2 and up to about 3.0. Higher functionality polyepoxides, i.e., greater than 3, are not preferred because of considerable chain branching and gelation problems. The preferred polyepoxides are polyglycidyl ethers of polyhydric phenols such as bisphenol A. These polyepoxides can be produced by etherification of a polyhydric phenol with an epihalohydrin such as epichlorohydrin in the presence of an alkali. Examples of polyphenols other than bisphenol A are halogenated bisphenol A: 1,1-bis- (4-hydroxyphenyl)ethane; 2-methyl-1,1-bis-(4-hydroxyphenyl)propane: 2,2-bis(4-hydroxy-3-tertiarybutylphenyl)propane: bis-(2-hydroxynaphthyl)methane; 1,5-dihydroxynaphthalene; and the like. While polyhydric phenols are preferred, other cyclic polyols can be used. Cycloaliphatic polyols such as 1,2-cyclohexanediol, 1,4-cyclohexanediol, 1,2-bis(hyroxymethyl)-cyclohexane, and hydrogenated bisphenol A, can be used.

Polyglycidyl ethers of polyhydric alcohols such as ethylene glycol, diethylene glycol, 1,2-propylene glycol, and 1,4-butylene glycol can also be used.

Polyglycidyl esters of polycarboxylic acids which are produced by the reaction of epihalohydrin or a similar epoxy compound with an aliphatic or aromatic polycarboxylic acid can also be used. Examples of polycarboxylic acids are dicarboxylic acids such as adipic acid, succinic acid, glutaric acid, terephthalic acid, dimerized linoleic acid and the like.

The polyesters of the present invention are liquid and are eminently suitable for use in a reaction injection molding process (RIM) to produce parts having excellent flame properties.

The invention is further illustrated but is not intended to be limited by the following examples in which all parts and percentages are by weight unless otherwise specified.

EXAMPLE 1

4850 parts of a polyoxyethylene glycol of about 400 molecular weight were added to a 12 liter flask. 1796 parts of phthalic anhydride were added over a period of about 15 minutes. The flask was heated to 130° C. and held at that temperature for 1½ hours. About 81 parts of AMC-2 (an accelerator available from Cordova Chemical Company and believed to be a chromium octoate) were then added. 2377 parts of Epon 828 (a liquid bisphenol-A epoxy resin available from Shell Chemical Company, having a maximum Gardner Color of 4, a viscosity at 25° C. of 100–160 poises and a weight per epoxide of 185–192) were then added and the reaction mixture was held at 130° C. for 1½ hours. The resultant product had an OH number of 149 and an acid number of 0.1.

EXAMPLE 2

4950 parts of Carbowax 600 (a polyoxyethylene glycol of about 600 molecular weight) were added to a flask. Over a period of about one hour, about 1222 parts of phthalic anhydride were added, during which time the temperature gradually rose to 110° C. After another ten minutes, the temperature had risen to 130° C. The temperature was held at 130° C. for 2½ hours. 62 parts of AMC-2 were then added. About 1540 parts of Epon 828 were then added over a period of about 15 minutes. The temperature was held at about 125° C. for about one hour. An additional 57 parts of Epon 828 were then added and the temperature was held at 125° C. for 2 ½ hours. Heating was stopped and the product, having an OH number of 118 and an acid number of 0.1, was stored at room temperature.

EXAMPLE 3

2800 parts of Carbowax 200 (a polyethylene glycol of 200 molecular weight) were weighed into a flask and heated to 80° C. Over a period of about 20 minutes, 2074 parts of phthalic anhydride were added. The temperature gradually rose during the addition, and after a total time of about 50 minutes, reached a temperature of 145° C. The temperature was then maintained at 130° C. for about 5 hours. 49 parts of AMC-2 were then added. About 2437 parts of Epon 828 were added over a period of about 55 minutes, after which time, the temperature had reached 165° C. The temperature was then adjusted to 130° C. After about 8 hours, 203 parts of Epon 828 were added, and the temperature was kept at 130° C. for another 5 hours. 107 parts of Epon 828 were then added and the temperature was kept at 130° C. for another 5 hours, after which time the product was cooled to room temperature. The product had an OH number of 187 and an acid number of 2.2.

EXAMPLES 4 through 9

In these examples various parts were made via the RIM process. The components used were as follows:

POLYOL A a glycerine-initiated polypropylene oxide product having an OH number of about 1050.

POLYOL B—a glycerine initiated polypropylene oxide product having an OH number of about 28, and having ethylene oxide tips.

EG—Ethylene Glycol

ADDITIVE A a quaternary ammonium salt of tall oil and the amide prepared from tall oil and N,N-dimethyl-1,3-propane diamine.

DC 193—a silicone surfactant commercially available from Dow Corning.

PC 8—Polycat 8—N,N-dimethylcyclohexylamine, available from Air Products.

T—12—dibutyl tin dilaurate.

AB 19—Antiblaze 19, a cyclic phosphate ester flame retardant available from Mobil.

Iso—a 50/50 blend of Mondur PF and Mondur MR (two commercially available isocyanates from Mobay Corporation), having an isocyanate group content of about 27%.

The components and the amounts thereof were as indicated in Table I.

RIM plaques were prepared using a laboratory pisten metering unit and clamping unit. The metering unit was a two component instrument having a maximum metering capacity of 0.6 liters. A rectangular mold, 300 mm×200 mm×8 mm, was added to mold the samples under the following conditions:

| | |
|---|---|
| Component A Temp | 32° C. |
| Component B Temp | 40° C. |
| Isocyanate Index | 110 |
| A/B Weight Rates | (125–140)/100 |
| Mold temperature | 60° C. |
| Impingement Pressure | 2646 psi |
| External Mold Release Agent | Silicone spray designated MR 515, available from Chemtrend |
| Demold time | 2 minutes |
| No post cure. | |

Various physical properties and flame properties were tested, with the results as set forth in Table I. Example 4 was a comparative test.

TABLE I

| Example | 4 | 5 | 6 | 7 | 8 | 9 |
|---|---|---|---|---|---|---|
| Component B | | | | | | |
| Polyol A | 55 | 45 | — | 45 | — | — |
| Polyol B | 45 | — | — | — | — | — |
| EG | — | — | 25 | — | 25 | 25 |
| Polyol of Example 1 | — | 55 | 75 | — | — | — |
| Polyol of Example 2 | — | — | — | 55 | 75 | — |
| Polyol of Example 3 | — | — | — | — | — | 75 |
| Additive A | 6 | — | — | — | — | — |
| DC193 | 3 | 3 | 3 | 3 | 3 | 3 |
| PC8 | 1.3 | 1.0 | 1.0 | 1.0 | 1.0 | 1.0 |
| T12 | 0.2 | — | 0.1 | 0.2 | 0.2 | 0.1 |
| AB19 | 17 | 17 | 17 | 17 | 17 | 17 |
| Component A Iso | 179 | 167 | 171 | 163 | 165 | 181 |

| ASTM Test | Example | 4 | 5 | 6 | 7 | 8 | 9 |
|---|---|---|---|---|---|---|---|
| D 792 | Density, pcf | 70.9 | 69.5 | 66.8 | 68.1 | 68.2 | 59.6 |
| D 256 | Charpy Impact ft/lb-in$^2$ | 17.17 | 15.96 | 2.48 | 18.94 | 13.72 | 1.63 |
| D 790 | Flex. Mod. @ RT, psi | 278,000 | 372,000 | 375,000 | 389,000 | 346,000 | 343,000 |
| D 648 | Heat distortion °C. (60 psi) | 112 | 101.4 | 73.8 | 100.5 | 86.3 | 87.9 |
| E 162 | Radiant Panel Test (Flame Spread Index) | 217 | 47 | 125 | 90 | 50 | 106 |
| D 638 | Tensile, psi | 7025 | 9400 | 3050 | 9850 | 8550 | NT |
| D 638 | Elongation, % | 4 | 12 | 0 | 5 | 10 | NT |
| — | Flammability | 26 sec | 30 sec | 33 sec | 21 sec | 19 sec | 23 sec |
| | UL 94 | V-0 | V-0 | V-0 | V-0 | V-0 | V-0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyester polyol having the idealized structure:

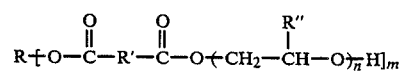

where R represents the residue of a polyepoxide after ring opening with a carboxylic acid group, R' represents the residue of a cyclic anhydride, n is a number of from 4 to 25, m represents the number of epoxy groups of the polyepoxide ring opened with carboxylic acid groups, and R'' represents —H or —CH$_3$.

2. The polyester of claim 1 wherein m is 2 or 3.
3. The polyester of claim 2 wherein m is 2.
4. The polyester of claim 2 wherein R'' is —H.
5. The polyester of claim 2 wherein R'' is —CH$_3$.